(12) United States Patent
Hanniel et al.

(10) Patent No.: US 8,982,121 B2
(45) Date of Patent: Mar. 17, 2015

(54) DIRECT RENDERING OF CAD MODELS ON THE GPU

(75) Inventors: Iddo Hanniel, Modiin (IL); Kirk Haller, Acton, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 711 days.

(21) Appl. No.: 13/349,421

(22) Filed: Jan. 12, 2012

(65) Prior Publication Data

US 2012/0182297 A1 Jul. 19, 2012

Related U.S. Application Data

(60) Provisional application No. 61/433,001, filed on Jan. 14, 2011.

(51) Int. Cl.
| | |
|---|---|
| *G06T 15/40* | (2011.01) |
| *G06T 17/00* | (2006.01) |
| *G06T 19/20* | (2011.01) |
| *G06T 15/06* | (2011.01) |
| *G06T 17/10* | (2006.01) |

(52) U.S. Cl.
CPC ............... *G06T 15/06* (2013.01); *G06T 17/10* (2013.01)
USPC ............................ 345/421; 345/423; 345/420

(58) Field of Classification Search
CPC ................................. G06T 11/20; G06T 17/10
See application file for complete search history.

(56) References Cited

U.S. PATENT DOCUMENTS

2007/0018988 A1* 1/2007 Guthe ........................... 345/441

OTHER PUBLICATIONS

Guthe, Michael, Aákos Balázs, and Reinhard Klein. "GPU-based trimming and tessellation of NURBS and T-Spline surfaces." ACM Transactions on Graphics (TOG) 24.3 (2005): 1016-1023.*
Schollmeyer, Andre, and Bernd Fröhlich. "Direct Trimming of NURBS Surfaces on the GPU." ACM Transactions on Graphics (TOG). vol. 28. No. 3. ACM, 2009.*
W. Randolph Franklin, "PNPOLY—Point Inclusion in Polygon Test" http://www.ecse.rpi.edu/Homepages/wrf/Research/Short_Notes/pnpoly.html (Dec. 31, 2009).
Marcel Cohen, "Programming in the GPU . . . and a brief intro to OpenGL Shading Language" VVR Talk. http://www.comp.leeds.ac.uk/vvr/papers/gpu-vvr2.pdf (accessed Mar. 16, 2012).
International Preliminary Report on Patentability and Written Opinion of the International Searching Authority for PCT/US2012/021112, "Direct Rendering of CAD Models on the GPU", dated Jul. 25, 2013.
Notification of Transmittal of the International Search Report and The Written Opinion of the International Search Authority, or the Declaration for International Patent Application No. PCT/US2012/021112, dated Apr. 18, 2012.

(Continued)

*Primary Examiner* — Kee M Tung
*Assistant Examiner* — Zhengxi Liu
(74) *Attorney, Agent, or Firm* — Hamilton, Brook, Smith & Reynolds, P.C.

(57) ABSTRACT

A computer-implemented method and system for rendering a computer-aided design model includes constructing a boundary representation data structure of the model comprising topological data for a face, constructing a data structure representing a parameter space of the face, and decomposing the parameter space into cells, where each cell indicates the presence of the face in the cell. The cells are encoded in a texture construct that is transmitted to a graphics processing unit where further processing renders the face on a computer monitor.

19 Claims, 11 Drawing Sheets

(56) References Cited

OTHER PUBLICATIONS

Schollmeyer, A., et al., "Direct Trimming of NURBS Surfaces on the GPU", ACM Transactions on Graphics, Article 47, 28(3), (Aug. 2009).

Pabst, Hans-Friedrich, et al., "Ray Casting of Trimmed NURBS Surfaces on the GPU", IEEE Symposium on Interactive Ray Tracing, pp. 151-160, (Sep. 18-20, 2006).

Kumar, S., et al., "Efficient rendering of trimmed NURBS surfaces", Computer Aided Design, 27(7):509-521, (Jul. 1, 1995).

Hanniel, Iddo, et al., "Direct Rending of Solid CAD Models on the GPU", 2011 $12^{th}$ International Conference on Computer-Aided Design and Computer Graphics (CAD/Graphics), IEEE, pp. 25-32, (Sep. 15, 2011).

\* cited by examiner

DIRECT RENDERING OF CAD MODELS ON THE GPU

RELATED APPLICATION

This application claims the benefit of U.S. Provisional Application No. 61/433,001, filed on Jan. 14, 2011. The teachings and disclosure of the referenced application are herein incorporated in its entirety.

FIELD

This application relates to Computer-Aided Design (CAD), and more particularly, to high-quality rendering.

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD modeling using solid modeling techniques is widely used for industrial design and other applications requiring high-quality rendering.

A solid model is generally represented by a boundary representation (B-rep), which consists of trimmed parametric surfaces with inter-references that maintain the topology of the model. For example, an edge shared by neighboring faces will have references (sometimes called half-edges or edge-uses) to both faces.

Referring now to FIG. 1, an illustration of a B-rep topological structure of a cube 100 is shown. A half-edge e11 typically stores references to the associated face f1 of e11, the next half-edge e12 of e11, and the opposite half-edge e21 of e11. FIG. 1 illustrates that given half-edge e11, the neighboring face f2 of e11 can be identified by taking the face of the opposite half-edge e21 of e11.

A design engineer is a typical user of a 3D CAD system. The design engineer designs physical and aesthetic aspects of 3D models, and is skilled in 3D modeling techniques. The design engineer creates parts and may assemble the parts into one or more subassemblies and assemblies. During the design process, a high quality rendering of the 3D model is often desired to present the model as a real-world object.

Traditional rendering methods preprocess a model into a tessellation stored in a computer-processing unit (CPU) memory and use the tessellation for rendering. As graphics processing units (GPUs) became common components of CAD systems, interactively rendering solid models involved tessellating the models using a CPU and then transmitting the tessellation to a GPU for further processing.

The trimming of surface patches may complicate the tessellation due to fine-grained sampling along the trimming loops, which is necessary to obtain an acceptable quality of the tessellation along the trimming loops. This process is time consuming and the tessellations have significant memory requirements. For example, empirical evidence has shown that tessellated model representations generally require an order of magnitude more memory than boundary representations. Moreover, the advent of client graphics applications (e.g., in the context of cloud computing) begs for the reduction of the size of the models transmitted over the Internet.

The desire to reduce the size of a transmitted model motivated on-the-fly tessellation approaches of trimmed parametric surfaces. M. Guthe, J. Meseth, and R. Klein; *Fast and memory efficient view-dependent trimmed NURBS rendering*; Pacific Conference on Computer Graphics and Applications, p. 204 (2002) discusses an approach implemented on a CPU. Whereas, M. Guthe, Á. Balázs., and R. Klein; *GPU-based trimming and tessellation of NURBS and T-Spline surfaces*; ACM Trans. Graph. 24, 3, o. 1016 (2005) and A. Krishnamuthy, R. Khardekar, and S. McMains; *Direct evaluation of NURBS curves and surfaces on the GPU*; ACM Symposium on Solid and Physical Modeling, ACM, p. 329 (2007) describe approaches that utilize a GPU.

Guthe et al. (2005) described tessellating trimmed non-rational bspline (NURBS) patches by subdividing patches into rational bi-cubic Bézier patches, which are passed as textures to a GPU and evaluated directly. Trimming is performed using a trimming texture, which is generated using a method implemented on a GPU. The trim texture is computed by rendering a polygonal approximation of each trim loop in the uv-domain of a surface. The trimming texture is then used as a mask to identify pixels that are outside the face boundary (either outside the outer loop or inside a hole).

While tessellation on the GPU may not require preprocessing and storing the control meshes in CPU memory, and does reduce the amount of data transmitted over the communication network, the surfaces are still approximated by tessellation techniques. Furthermore and in general, when a user zooms into a model, the tessellation must be updated to reach a finer approximation.

As GPU technology becomes more advanced, rendering of models directly on the GPU becomes not only of higher quality, but also competitive in terms of computation speed. Methods have been described that directly render solid models and trimmed surfaces thereof directly on a GPU without a tessellation preprocess, and generally render the models when needed. (For example of the later, see Krishnamuthy et al.)

Rendering a solid model directly on the GPU without tessellating the model has advantages, which by way of non-limiting example include pixel-level rendering quality, less memory requirements, and less preprocessing requirements. Yet, one of the main problems with existing solutions for rendering solid models directly on the GPU without first creating a tessellation is the appearance of crack/gap artifacts between faces due to the approximations of trimming curves. These undesirable artifacts prevent or have a limiting effect on the usage of direct GPU rendering in CAD systems.

GPU ray casting methods are also utilized for rendering of surfaces. Such methods include rendering implicit algebraic surfaces (see C. T. Loop, and J. Blinn; *Real-time GPU rendering of piecewise algebraic surfaces*; ACM Trans. Graph. 25, 3, 664 (2006)) and constructive solid geometry (CSG) primitives (see F. Romeiro, L. Velho, L., and L. H. De Figueiredo; *Scalable GPU rendering of csg models*; Computers & Graphics 32, 5, p. 526 (2008). These methods render directly in terms of the surface polynomial representations, as opposed to a set of approximating triangles. The advantages are high-quality results compared to rendering tessellations and reduced memory usage.

Other ray casting techniques have been proposed to render parametric/trimmed surfaces directly on the GPU, such as H. F. Pabst, J. Springer, A. Schollmeyer, R. Lenhardt, C. Lessig, and B. Froehlich; *Ray casting of trimmed NURBS surfaces on the GPU*; Interactive Ray Tracing 2006, IEEE Symposium; p. 151 (2006), and A. Schollmeyer and B. Fröhlich; *Direct trimming of NURBS surfaces on the GPU*; ACM Trans. Graph. 28 (July), 47:1; (2009). These techniques use fragment shaders (also referred to as pixel shaders), to compute the intersection, or lack thereof, of a ray with a trimmed parametric surface. Such techniques enable rendering of trimmed surfaces up to pixel-level resolution seamlessly.

Ray casting of trimmed parametric surfaces, however, present further difficulties since the polynomials involved may be of higher degree, requiring numerical root extraction, and for the trimming of the surfaces, a point classification algorithm. Pabst et al. presented a GPU-based non-uniform rational b-spline (NURBS) ray casting implementation using a bi-variate Newton iteration to solve the ray-patch intersection problem. In order to achieve convergence to the root, Pabst et al. subdivide the surface into sub-patches in a pre-processing step and compute the convex hull of each sub-patch. The convex hull is then used as a bounding volume for rendering, and utilized to find a good initial value for the numeric iteration.

The trimming of the surfaces may present a problem for both tessellation and ray casting approaches. The basic problem is to classify whether a given point is inside a given face, in which case the point should be rendered, or outside the given face, in which case the point should be discarded. As previously discussed, a trimming texture can be used. Such a texture is a simple binary texture that stores, for example, a black pixel for outside and a white pixel for inside a given face. The fragment shader then checks whether the texture value corresponding to the pixel is black and if so performs no further operation using the pixel. The problem with this method is that the method introduces pixelization artifacts.

FIGS. 2*a* and 2*b* illustrate pixelization artifacts due to trimming texture decimation on a model of a duck with trimming loops around the eyes of the duck. FIG. 2*a* shows a full view of the duck model, whereas, FIG. 2*b* shows a close up view of the duck's eye. The texture is basically a pixelization of the uv-domain, and therefore, the mapping of the uv-domain of the surface to 3D space can produce noticeable effects. Recomputing the trimming texture with a higher resolution has the drawback of slowing down the application and requiring more GPU memory.

A more accurate method, which overcomes the pixelization artifacts of the trimming texture, uses the trimming curves directly for point classification. Pabst et al. provide an iterative implementation of a Bézier clipping algorithm to perform the trimming directly in the fragment shader. Schollmeyer et al. improve this method by preprocessing the trimming uv-curves into monotonic segments and using an acceleration structure combined with a bisection method to quickly identify whether a point is within a trimming loop.

The results of these more accurate trimming methods are finer and smoother surface boundaries and intersections. However, as noted by Schollmeyer et al., gaps still remain along the trim curves of adjacent faces. The reason is that the trimming curves in the surface uv-domain are approximations, and as pointed out by X. Song, T. W. Sederberg, J. Zheng, R. T. Farouki, and J. Hass; *Linear perturbation methods for topologically consistent representations of free-form surface intersections*; Computer Aided Geometric Design 21, p. 303 (2004), representing the trimming curves exactly is a difficult task. Therefore, an inherent gap exists in the geometry between two approximations of the same curve. Á Balázs. M. Guthe, and R. Klein writing in *Fat borders: Gap filling for efficient view-dependent LOD NURBS rendering*; Computers and Graphics 28, 1 (February), p. 79 (2004) attempted to overcome this problem in the context of real-time tessellation rendering by adding so-called "fat borders" that fill gaps between surface patches. However, filling the gaps in this way constructs additional geometry, which may decrease performance and introduce unwanted artifacts.

One of the main problems with existing solutions for rendering solid models as trimmed surfaces on the GPU is the appearance of crack/gap artifacts between faces due to the approximations of the trimming curves. Even where the trimming was performed using a trimming curve representation and not using trim textures as in previous techniques, gaps still existed between neighboring faces of a solid model (see Schollmeyer et al.).

Thus, a drawback of current state-of-the-art techniques includes the existence of crack/gap artifacts when directly rendering a model on a GPU without first tessellating the model. These inherent cracks/gaps are introduced by the approximation of the trimming curves. A system or method that addresses this and other drawbacks would greatly enhance current state-of-the-art computerized systems by allowing the high quality rendering of a 3D model without the undesirable crack/gap artifacts.

SUMMARY OF THE INVENTION

An example embodiment of the present invention may be implemented in the form of a method or corresponding product, data storage medium, or apparatus for rendering a solid computer-aided design (CAD) model directly on a GPU, and include, given a CAD model representing a real-world object constructing a boundary representation data structure of CAD model, which stores topological data comprised of data defining a face, constructing a data structure representing a parameter space of the face, and decomposing the parameter space into a number of cells.

For each cell, the presence of the face in the cell is designated by indicating that the cell is an empty type cell, a full type cell, an edge type cell, or a vertex type cell. The cells are encoded into a texture construct, which is transmitted to a graphics processing unit (GPU) where further processing renders the face on a computer monitor.

Implementations may include the edge type cell and the vertex type cell referencing representations of one or more trimming surfaces, wherein the trimming surfaces correspond to neighboring faces of the face; storing an underlying surface of the face, a uv parameter space bounding box of the face, and a 3D bounding box of the face; and encoding the trimming surfaces in a trimming surface texture for transmission to and processing by a the GPU. Furthermore, the trimming surfaces may be represented analytically as a plane, a cylinder, a cone, a sphere, a torus, a NURBS surface, or a generic surface. Upon receiving the texture construct, the GPU performs a ray casting process to render the face using the texture construct and one or more of the trimming surface representations, which are referenced by the cells encoded in the texture construct.

Other implementations may include a point classification process that determines whether a ray intersects an underlying surface of the face and rendering a corresponding pixel if the ray does intersect. Additionally, the CPU encodes the presence of the face as a cell type, where the types indicate that (i) no part of the face intersects with the parameter space area corresponding to the cell; (ii) a total area of the cell contains material of the face; (iii) a reference to a trimming surface corresponding to a neighboring face is stored; and (iv) references to two trimming surfaces corresponding to two neighboring faces are stored. Further, the cells are stored in a cell data structure, which may be implemented as a grid structure or a tree data structure.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

Figure 1:
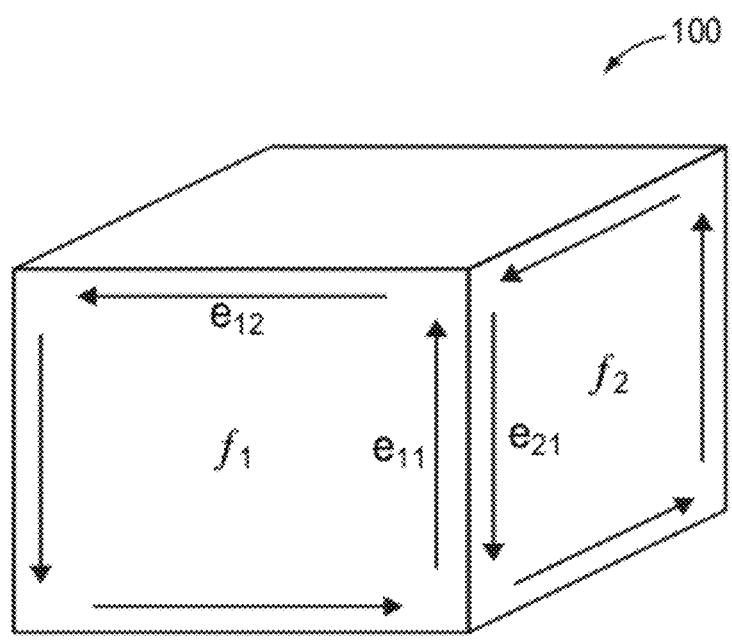
FIG. 1 is an illustration of a B-rep structure for a cube.
Figure 2A:
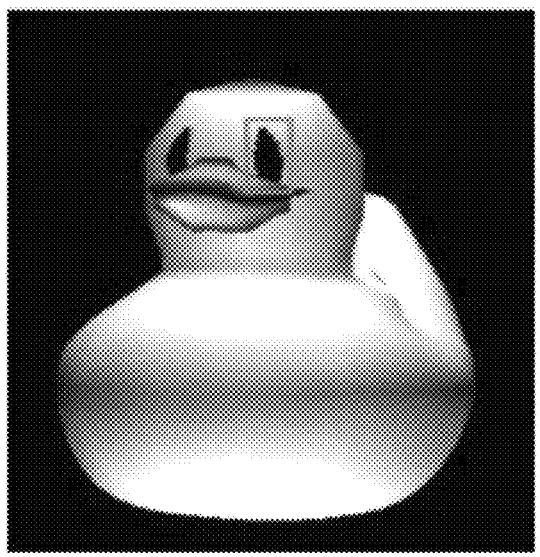
FIG. 2a and FIG. 2b are illustrations of pixelization artifacts.
Figure 2B:
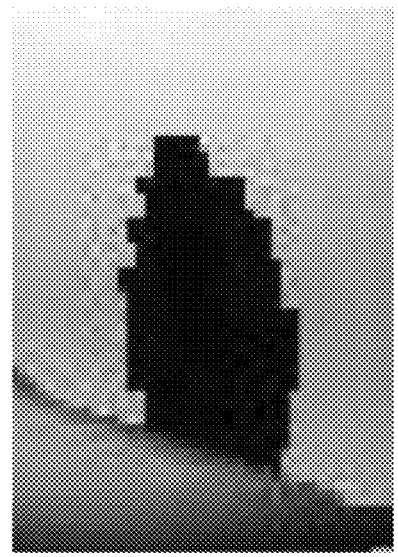

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

The present invention provides for high-quality rendering of a computer-aided design (CAD) model without introducing cracks and gaps in the rendering. Rather than using the geometry of trimming curves directly, the present invention makes use of the topology information available via a boundary representation of the model.

The present invention combines a unique representation of the faces of a solid model, which are passed to the graphics processing unit (GPU) encoded as textures. A fragment shader (which computes color and other attributes for each pixel and may process pixels in parallel in the GPU), receives bounding boxes of the faces as input, along with parameters of underlying surfaces and the encoded textures. Fragment shader methods utilize the representation of the faces for identifying a surface area to be rendered. Using implementations of the present invention, high quality renderings of models without the presence of crack/gap artifacts may be achieved at interactive speeds.

Additionally, the present invention performs a ray casting computation to render CAD models. The ray casting computation, executed by a fragment shader, checks whether the ray hitting the bounding box hits the underlying surface. If the ray does intersect the surface, a point classification process checks whether the point is within the area defined by surface representation(s). Unlike the classification methods described by Guthe et al. (2005) and Schollmeyer et al., which utilize trimming textures and trimming uv-curves, respectively, the present invention implements a point classification method that utilizes a neighboring face along an edge to identify whether a point is inside or outside of the face upon which is currently being operated The present invention introduces a new representation of the trimming loops and uses this new representation in a point classification process. Trimming curves do not generally have a parametric algebraic representation and are therefore typically approximated within a CAD system. However, a trimming curve can also be viewed as the intersection of two surfaces—one corresponding to a face currently being processed and the other corresponding to a neighboring face. Furthermore, the neighboring surfaces (e.g., one neighboring surface for an edge and two neighboring surfaces for a vertex where three edges meet), and their orientation relative to a face currently being operated upon are accessible through the topology of the B-rep structure. Thus, by storing a reference to the intersecting surface the point classification problem in the neighborhood of the trimming loop is solved by classifying on which side of the surface the point lies and is transformed from a uv-domain 2D classification to a 3D point classification. Furthermore, many of the present invention's classification queries operate on simple analytical surfaces for which the classification is straightforward.

The trimming loops of a face are encoded not with trimming curves, which are inherently non-exact, but with trimming surfaces. Additionally, the present invention makes extensive use of the analytic representations of surfaces (e.g. planes, cylinders, cones, spheres, torii), which are easier to compute and encode than splines. These analytic representations of surfaces compose the majority of surface representations in typical models designed using state-of-the-art CAD systems.

In one embodiment of the present invention two phases are implemented—a preprocessing CPU phase and a GPU phase run from a fragment shader. In the CPU phase, each face is stored in CPU memory with a data structure for the face's loops, the face's underlying surface and other parameters including the face's uv bounding box and 3D bounding box, and other attributes needed for visualization such as color. The face parameter (uv) space is decomposed into cells, each cell can be empty (meaning that no part of the face intersects with the cell), full (meaning that the complete cell contains material of the face), or contain an edge or a vertex. For cells containing an edge or a vertex, the cell data structure stores references to one or two trimming surfaces corresponding to the one or two neighboring faces (one for edge cells, two for vertex cells) from which the loop edge or vertex originated. The cell data structure can be implemented as a regular grid over the parameter space or using a quad-tree where empty, full, edge and vertex cells are leaves of the tree. In the preprocessing step, the face representation and the cell data structure are constructed, and the cell data structure is encoded for each face in a trim state texture. The trimming surfaces are encoded in a trim surfaces texture, which is referenced by the trim state texture. An encoding of a trimming surface can, by way of non-limiting example, simply store the axis and radius of a cylinder and respective basic parameters for other types of surfaces.

Figure 3:
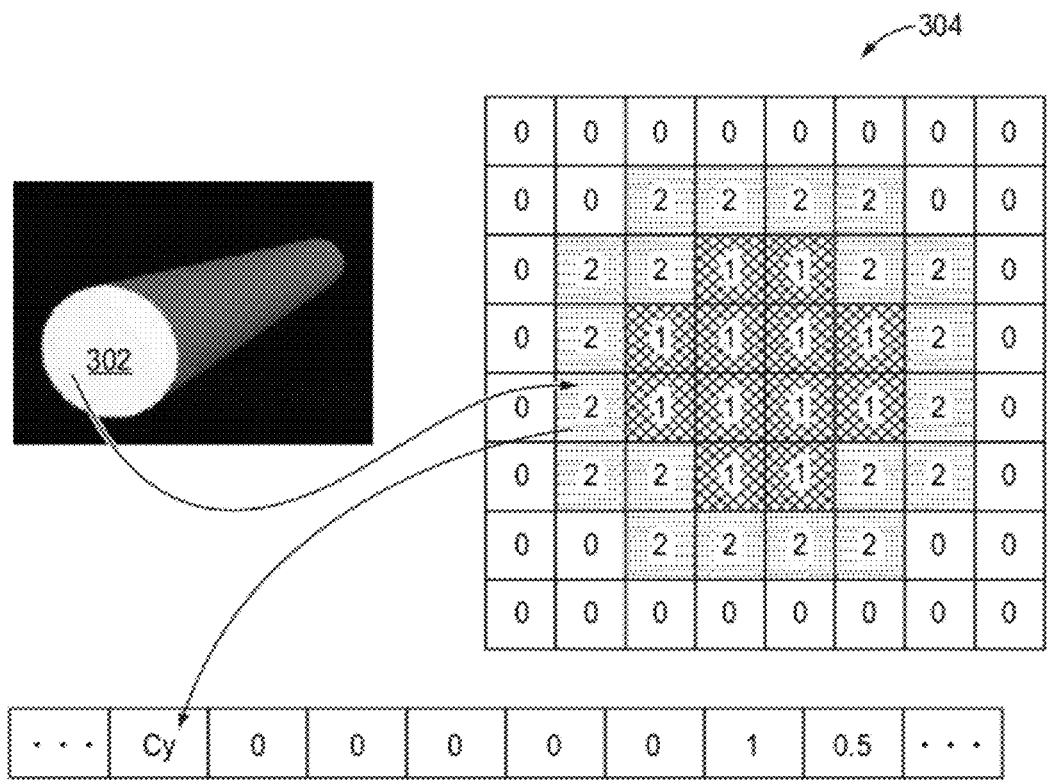
FIG. 3 is an illustration of a face representation.

Referring now to FIG. 3, an embodiment's representation for a planar face that caps a cylinder is shown. In FIG. 3, the planar face 302 of the cylinder is stored in a cell data structure 304 (in this case, a regular grid) encoded in the trim state texture. The 0-cells are empty cells, the 1-cells are inner cells, and the 2-cells are edge cells that hold references to the trimming cylinder representation in the trim surface texture. The encoded data and computation thereof will later be discussed.

The GPU phase is implemented in the fragment shader. In the fragment shader, if a ray hitting a bounding box intersects with a surface, the intersection point and uv-parameters are computed as well as the normal of the surface at the intersection point. The cell data structure is then searched for the cell with the uv-point. If the cell is an empty cell the pixel is discarded. Otherwise, the pixel color is computed using a shading method such as Phong shading or Blinn-Phong shading.

In the next step, if the cell is full, the color is returned. If the cell is an edge cell, the ray intersection point is compared to the trimming surface, which is decoded from the trim surface texture. The pixel is discarded if the point is on the outside orientation of the surface. If the cell is a vertex cell then similarly the ray intersection point is compared to the trimming surfaces from which the vertex originated. A vertex cell can be a union cell or an intersection cell. In a union cell the pixel is discarded if the point is on the outside orientation of both surfaces. In an intersection cell the pixel is discarded if the point is outside either of the surfaces.

An embodiment handles several surface types for ray casting and for point classification, including the common surface types used in CAD solid modeling, namely planes, cylinders, cones, torii, spheres, and NURBS surfaces. In addition, a generic mesh surface is used for any non-common surface types.

All surfaces are parametric and represented by a uv-domain [u0; v0]×[u1; v1]. The analytic surfaces also store a local coordinate system {O; x; y; z}. (Herein bold notation denotes vector values.) Specifically, the following describes the representation of the surfaces.

The plane equation is given by $S(u,v)=ux+vy+O$. Therefore, the uv-domain and local coordinate system describe the surface fully.

The cylinder equation is given by $S(u,v)=R((\cos u)x+(\sin u)y)+vz+O$; where R is the cylinder radius and $0 \leq u < 2\pi$. Thus, an additional radius parameter R is passed to the fragment shader.

The cone equation is given by $S(u,v)=(R+v(\tan \theta))(((\cos u)x+(\sin u)y))+vz+O$; where R is the radius of the intersection circle of the cone with the xy-plane. $\theta$ is the half-angle of the cone apex. The domain must satisfy $0 \leq u < 2\pi$ and $-R(\cot \theta) \leq v < \infty$. The cylinder representation therefore has an additional radius parameter R and angle parameter $\theta$, which are passed to the fragment shader.

The sphere equation is given by $S(u,v)=R(\cos v)((\cos u)x+(\sin u)y)+R(\sin v)z+O$; where R is the radius of the sphere and the domain satisfies $0<=u<2\pi; -\pi/2<=v<\pi/2$. The sphere representation therefore has an additional radius parameter R, which is passed to the fragment shader.

The torus equation is given by $S(u,v)=(R+r(\cos v))((\cos u)x+(\sin u)y)+r(\sin v)z+O$; where R and r are the major and minor radii of the torus, respectively, and the domain satisfies $0 \leq u < 2\pi; -\pi <= v < \pi$.

Unlike the analytic surfaces, a NURBS surface does not have a local coordinate system and is represented by the degree of the surface and knot vectors of the surface in u and in v, and by the control mesh of the surface in the global coordinate system. The NURBS representation is:

$$S(u, v) = \sum_{i=0}^{m} \sum_{j=0}^{n} p_{ij} B_{ij}(u, v)$$

where m and n are the degrees of the NURBS in u and v, $p_{ij}$ are the control points in the control mesh and $B_{ij}(u, v)$ are the NURBS basis functions.

CAD systems may use other surface representations instead of or in addition to analytical and NURBS surfaces. For example, to represent an offset surface, which is a procedural surface, some systems store a reference to the base surface and an offset-distance value. Such a representation cannot be represented exactly using a NURBS surface. Thus, for example, the equation for an offset surface may include a square root. Offset surface representations typically are used as black boxes that can answer queries on point and derivative evaluation at a given uv-parameter. To support less common surface representations and as a generic surface for an unsupported surface, an embodiment utilizes a surface representation comprised of a mesh with normal values at the mesh vertices; such normal values are obtained by querying the procedural surface. The meshes are regular meshes over the entire surface domain. The trimmed domain is not triangulated. The trimming of the meshes without gap artifacts is performed in the fragment shaders in the same way as is performed for other surfaces (i.e., using trimming surfaces).

When rendering an analytic surface, a 3D box bounding the surface is rendered. The ray emanating from the viewpoint is computed with respect to the point of intersection with the box. Given the viewpoint position O in the surface local coordinate system (i.e., object space) and the ray direction vector d, the ray in the surface local coordinate system is parameterized by $R(t)=O+dt$. The fragment shader then computes the intersection points by finding the roots of a polynomial in t. The polynomial is constructed by plugging the linear equation of R(t) into the implicit equations of the analytical surfaces. The result is a quadratic equation for cylinders, cones, and spheres, and a quartic equation for torii. (For planes there is no need for this procedure; rather, the underlying plane is rendered directly and the shader only performs the point classification process.) Thus, the fragment shaders only need to solve a quadratic or quartic equation in order to get the intersection point (or lack thereof, in which case the pixel is discarded). Given the intersection point, the uv parameters and the normal at the intersection point is easily computed, and from those uv parameters and the normal, the shading color is computed.

For a mesh surface, the ray casting in the shader implements a Blinn-Phong shading method, which interpolates the vertex normal values. For a NURBS surface, finding the ray-surface intersection is more complicated. A similar method to that described by Pabst et al. and Schollmeyer et al. is used. An embodiment divides the surface into Bézier patches, (which are easier to handle than bspline patches within the shaders, although bspline patches may also be used), and further subdivides the patches to sufficiently flat sub-patches. Bounding volumes of the sub-patches are then rendered using oriented bounding boxes, unlike Pabst et al. that described the use of convex hulls of the patches. The result is a bi-variate system of polynomial equations in u and v (see Pabst et al. for details) that is solved using a Newton-Raphson iteration. Once the intersection point with the underlying surface is known, the intersection point is passed to the point classification process.

The point classification process first takes the uv-point on the face and searches for the corresponding uv cell in the cell data structure. If the cell is an empty cell, the uv-point is discarded then the process checks the next root of the ray-surface intersection polynomial for another ray intersection with the underlying surface that may be within the surface domain and inside the face. If the cell is a full cell, the pixel shade is computed using the exact normal value and the pixel is rendered. If the cell is neither full nor empty, the cell contains an edge, two intersecting edges (i.e., a vertex), or two edges that do not intersect (which may result from a coarse-grain cell structure), and the process applies a 3D point classification based on the trimming surfaces the cell references.

In an embodiment, two cell data structures are implemented. The first cell data structure is implemented as a regular grid and stored as an RGB texture. The first value (R) stores the type of cell, and the other two values (GB) are reserved for referencing trimming surfaces in the trim surface texture. The type of cell may be empty, full, edge, union vertex, or intersection vertex.

An empty type cell contains a uv subdomain that is not contained in the face, that is, outside the outer loop or totally inside a hole. The GB values in the empty type cell are null. A full type cell contains a uv subdomain that is completely inside the face. The GB values in the full type cell are also null. An edge type cell contains a single edge, which is a trimming curve. The G value of the edge type cell references an index in the trim surface texture, which references a representation of the trimming surface. An union vertex type cell contains two edges that are incident at a vertex. The G and B values of the union vertex type cell references indices in the trim surface texture, which in turn reference representations of the trimming surfaces.

An intersection vertex type cell is similar to the union vertex type cell; however, the classification procedure treats the union and intersection vertex type cells differently because an union vertex type cell is a result of a union boolean operation between two surfaces, whereas, the intersection vertex type cell results from an intersection between two surfaces. Thus, for an union vertex type cell, if a point is on the inner side of either trimming surface the point will be rendered. Whereas, for the intersection vertex type cell, a point is rendered only if the point is on the inner side of both trimming surfaces. The distinction between an union vertex type cell and an intersection vertex type can be determined based on the orientations of the edges around the vertex, as described with reference to FIG. 4a and FIG. 4b.

Figure 4A:
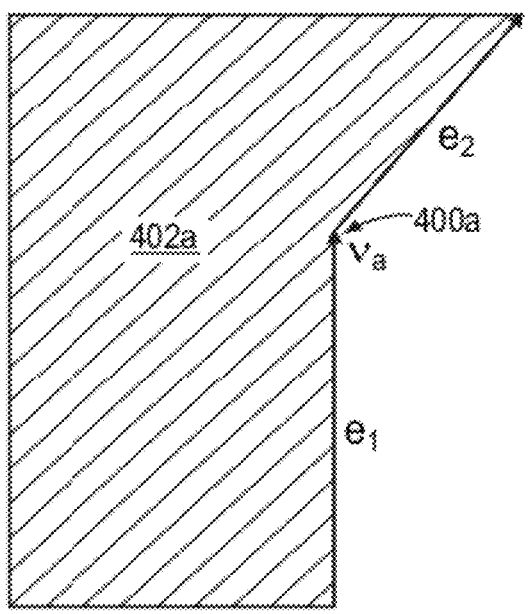
FIG. 4a illustrates an union vertex.
Figure 4B:
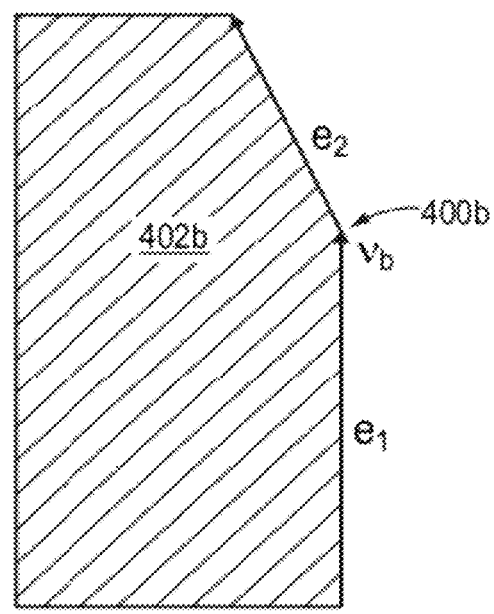
FIG. 4b illustrates an intersection vertex.

Referring now to FIG. 4a, $v_a$ is a union vertex 400a. The edges e1 and e2 in FIG. 4a make a right turn, and therefore, the surface 402a has added material when compared to a case where the edges form a straight line. FIG. 4b shows an intersection vertex 400b denoted as $v_b$. The edges e1 and e2 in FIG. 4b make a left turn, and therefore, the surface on 402b has reduced material when compared to a case where the edges form a straight line.

A second implementation of a cell data structure is a quad-tree representation, as described in M. de Berg, O. Cheong, M. Van Kreveld, and M. Overmars; *Computational Geometry, Algorithms and Applications,* 3rd ed. Springer, New York; (2008), and is also stored in an RGB texture. The leaf nodes of the quad-tree store the same types of cells as in the grid cell structure previously described. However, the inner nodes of the quad-tree, which have an R value that indicates the nodes as inner nodes, refer to the first of a block of four cells that are the children of the inner node.

In the fragment shader, given a computed uv value, a search procedure searches the cell data structure for the cell that contains the given uv point. The steps of the search procedure are dependent on the type of cell data structure. If the cell is neither empty nor full, the 3D point on the surface corresponding to the uv-point is evaluated. Then the 3D point is compared to the one or more surfaces referenced by the cell.

As previously discussed, for each edge (i.e., each trimming curve) of a face, there exists a corresponding trimming surface referenced from cells in the cell data structure. The trimming surfaces are encoded in a floating point trim surface texture that stores the respective parameters of the surfaces. The first cell holds the surface type and the fragment shader activates a function that reads the surface from the texture based on the surface type.

For analytic surfaces, the representations are compact, based on the parameters previously described in the discussion of surface representations. NURBS surface representations are less compact, and therefore, only the relevant Bézier sub-patches that actually intersect the face are stored in the trim surface texture. Similarly, for mesh surfaces, only the relevant triangles that actually intersect the face are stored during a preprocessing step.

When constructing the cell data structure, the preprocessing procedure identifies for every cell whether the points of the face should lie on the positive or negative side of the surface. This information is also stored in the trim surface texture. Note that all surface representations previously described have a positive surface normal, which is defined as the direction of the cross product $S_u(u,v) \times S_v(u,v)$ at a given uv-value. Therefore, in a sufficiently close neighborhood of a surface, a point p is either on the positive or on the negative side of the surface. This can be determined when classifying a 3D point, by projecting p onto the surface, finding the closest point Sp on the surface, and comparing the vector p−Sp with the normal at Sp.

The construction of the cell data structure is performed on the CPU, which then encodes the data structure into the trim state texture, which is then queried in the shader as previously described. The construction procedure receives as input the trimming loops, and then partitions the uv-domain of the surface into cells that contain uv sub domains.

Figure 5A:
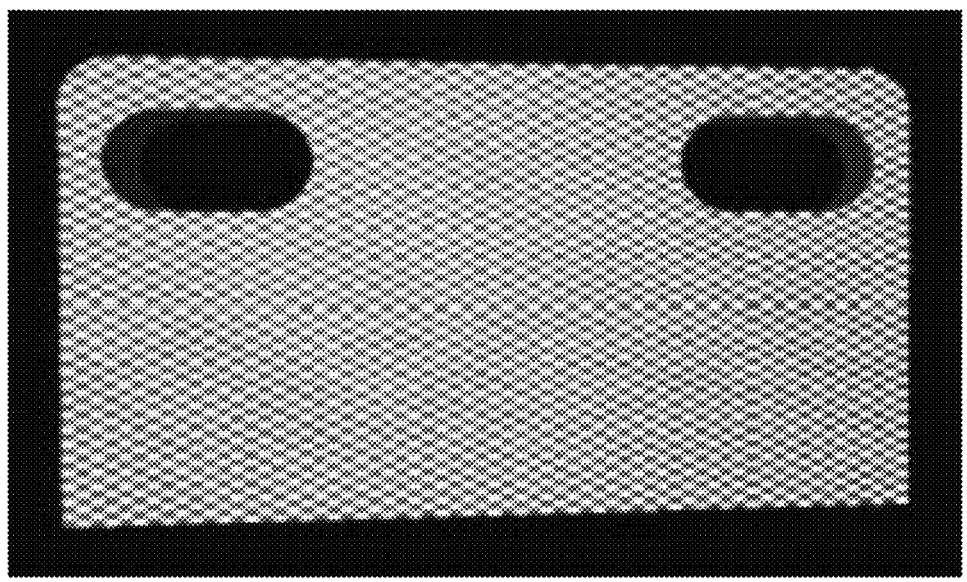
FIG. 5a and FIG. 5b illustrates cell data structures.
Figure 5B:
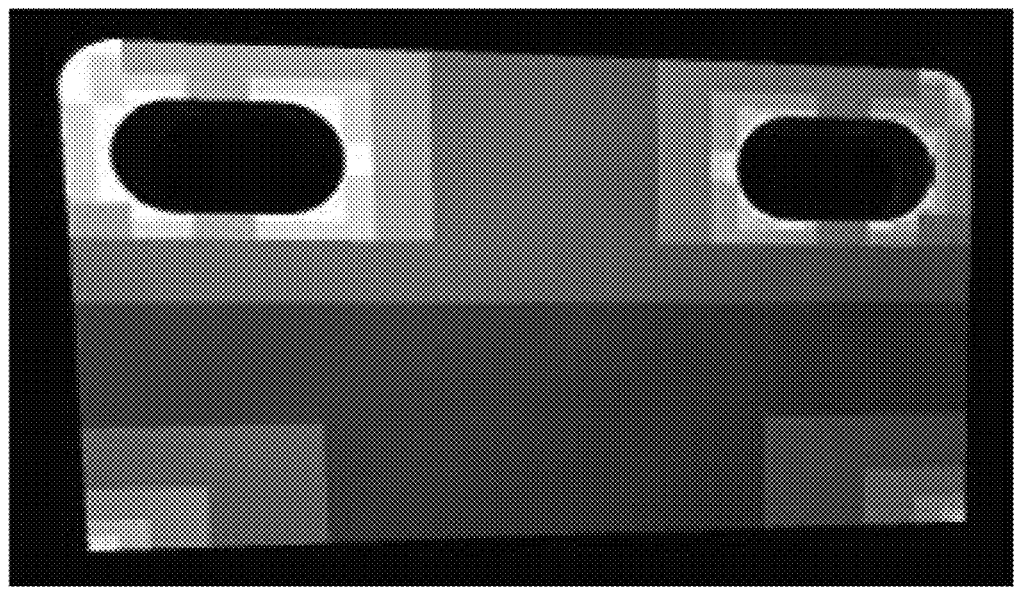

Referring now to FIGS. 5a and 5b, illustrations of the cell structures are shown. FIG. 5a shows a grid cell structure with a 64×64 grid. The grid squares are colored in two shades to distinguish between the cells. FIG. 5b shows a quad-tree cell structure where the smallest cell in the quad-tree is 0.01 of the domain width. The quad cells are colored in different shades, where leaf cells that are further from the root cell are colored in lighter shade.

The grid cell structure is a uniform grid that is laid on the uv-domain. The trimming loops are intersected with the grid and every grid cell stores a reference to the one or more trimming curves that intersect with the respective grid cell. Excluding degenerate end cases, for a sufficient resolution of the grid there are at most two edges in a cell—one if an edge passes through the cell and two if the cell contains a vertex. In rare cases, a cell may contain more than two edges or contains two edges that do not meet at a vertex, which may happen, for example, in trimming loops that are nearly tangent. In such rare cases, the grid may be reconstructed with a finer resolution. Once all the edge and vertex cells have been identified, the cells that do not hold an edge are traversed, and using a polygon point containment test, are classified as full or empty.

The distinction between union and intersection vertices requires further computation. First, the edges are assumed to be oriented so that the material of the face is to the left of each edge, which is a common convention in CAD systems. However, an embodiment may assume that the edges are oriented so the material is to the right of each edge and have similar results. Given a vertex cell, the incoming edge is denoted by ei and the outgoing edge is denoted by eo. If the edges {ei; eo} perform a left turn then the vertex is an intersection vertex (i.e., the intersection with the surface on eo reduced material as shown in FIG. 4b). Otherwise, the vertex is a union vertex (i.e., the surface on e1 added material as shown in FIG. 4a).

Determining the orientation of {ei; eo} is performed by taking the tangent of the trimming curves at the endpoints and computing the cross product between them.

The quad-tree cell data structure recursively subdivides the uv-domain into subdomains until a termination criterion is satisfied (e.g., size or the overall number of subdomains). Each inner cell holds references to the inner cells's four children subdomains and also holds a list with references to all edges that intersect the respective inner cell. If the cell subdomain contains no edges, then the cell is a leaf of the quad-tree and is classified as either an empty or full leaf cell in the same way as was done for the grid cell data structure. Otherwise, the subdivision continues until only one or two edges intersect the cell or until the cell size reaches some small tolerance, which may happen in degenerate cases.

When the cell contains only one edge, the cell is a candidate to be a leaf cell; although, having only one edge does not guarantee that the cell is a leaf. Verification is needed that the cell intersects the trimming surface only with a single component (branch). Otherwise, a point inside the cell that is outside the other branch of the surface will be treated incorrectly, for example, rendered when the point should be discarded or vice versa. Consider for example the configuration in FIGS. 6a and 6b.

Figure 6A:
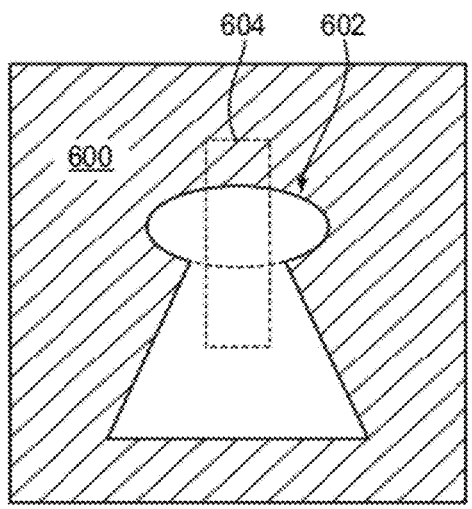
FIG. 6a and FIG. 6b is an illustration of a classification issue in an embodiment.
Figure 6B:
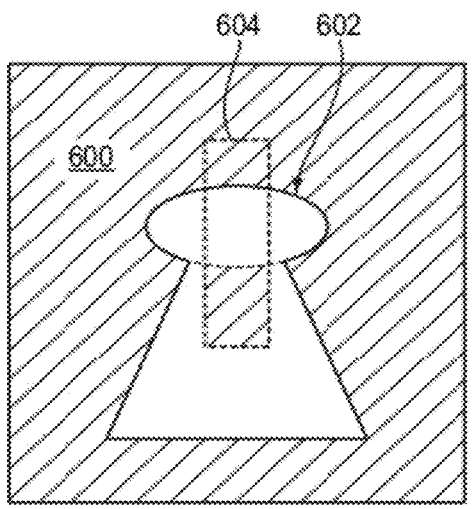

FIGS. 6a and 6b show a keyhole-shaped hole in a surface 600. A top edge 602 of the keyhole-shaped hole is an elongated arc of an ellipse on a plane. This, for example, can be a result of part of a cylinder intersecting the plane. Only points that are above the upper arc of the ellipse, as shown in FIG. 6a, should be rendered. However, if the cell 604 intersects the ellipse more than once as in the FIGS. 6a and 6b, the point classification procedure described herein will render also those points that are outside the other branch of the ellipse (i.e., the points under the ellipse as denoted by the shaded area in FIG. 6b. Therefore, a procedure must check that the cell intersects the trimming surface with only a single connected component.

FIGS. 6a and 6b demonstrate a classification issue that needs to be avoided and may occur when an ellipse intersects a leaf cell twice. The bold line outlining the keyhole shape is the loop of a hole in the face. The dashed rectangle is the area of a leaf cell in the quad-tree. The full ellipse has two branches in the cell where the dotted line shows the other branch. FIG. 6a illustrates the desired result where only the area above the ellipse is rendered. Whereas, FIG. 6b illustrates an undesirable result where the lower branch intersects the cell and causes the lower area to be rendered as well.

If the edge is between tangent faces, the procedure does not terminate but rather continues the subdivision until the minimum cell size is reached. Continuing the subdivision addresses difficulties tangent faces present in the point classification procedure. Similarly, if a cell contains two edges connected at a vertex, the edges must satisfy the same conditions as previously discussed. Furthermore, a vertex between tangent edges also presents difficulties in classification, and therefore in such a case, the subdivision continues until the minimum cell size is reached.

Figure 7A:
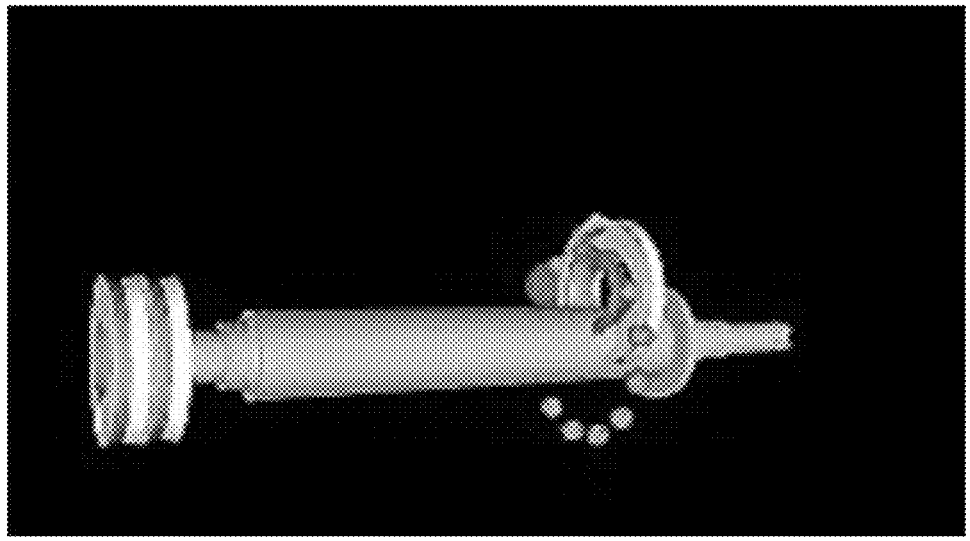
FIGS. 7a, 7b, and 7c illustrate per-pixel accuracy in an embodiment.
Figure 7B:
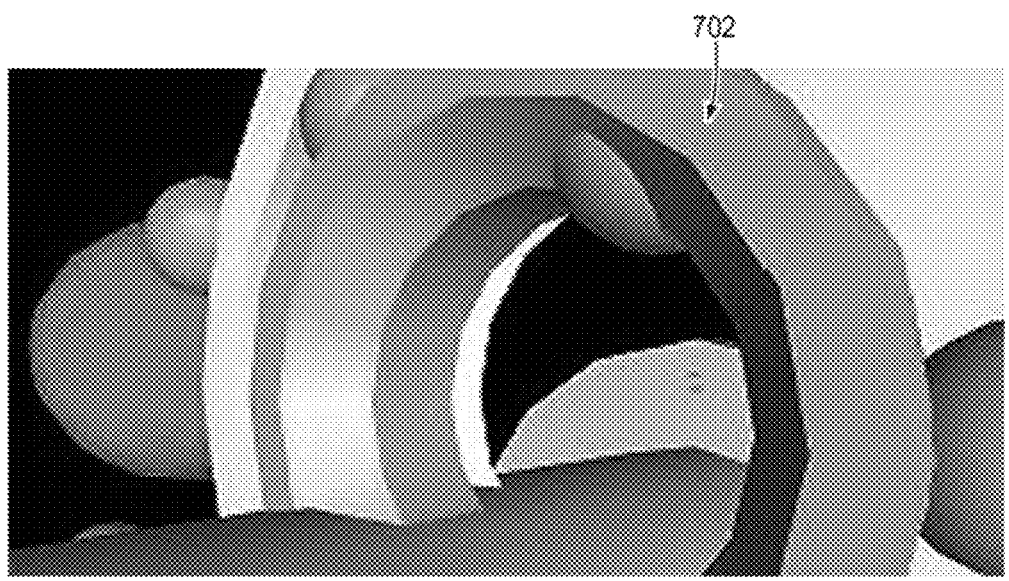
Figure 7C:
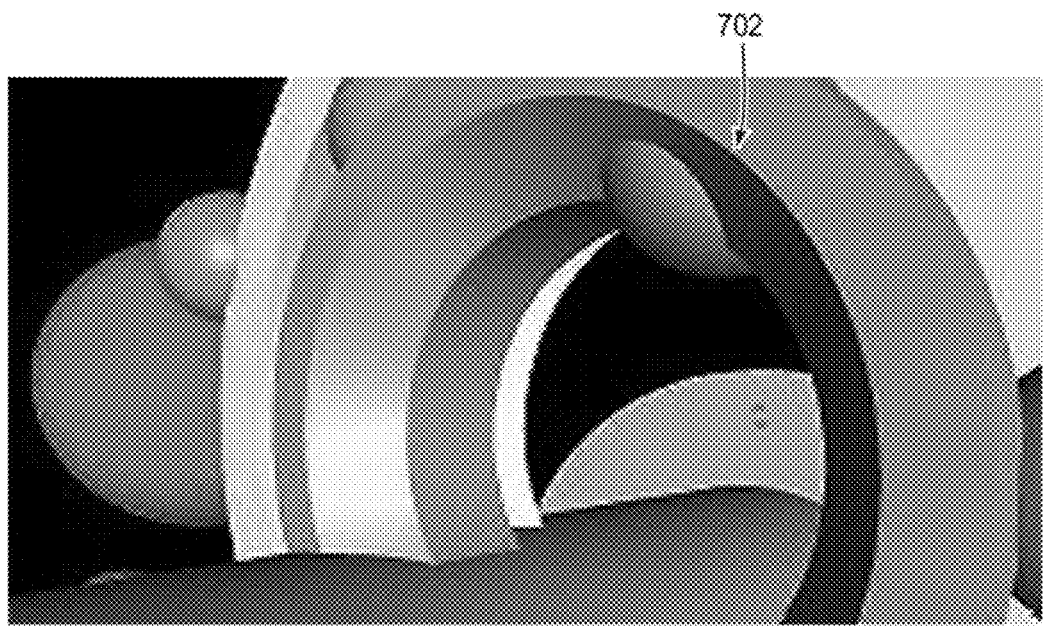

Referring now to FIGS. 7a through 7c, the per-pixel accuracy of an embodiment is shown. FIG. 7a shows a 3D model. FIGS. 7b and 7c show zoomed-in views of the 3D model in FIG. 7a. Further, FIG. 7b illustrates a zoomed-in view using a common tessellation method; whereas FIG. 7c illustrates a ray-casting approach in one embodiment of the present invention. In particular, the curvature of the rim 702 shown in FIG. 7c is much smoother than the curvature or lack thereof of the rim 702 shown in FIG. 7b.

Figure 8:
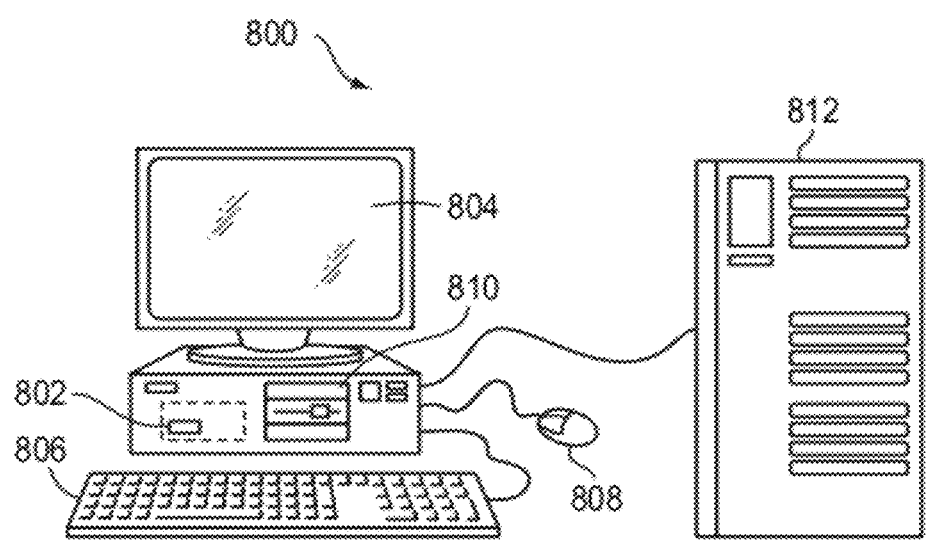
FIG. 8 is a schematic diagram of a computer system in which embodiments of the present invention are implemented.

Referring now to FIG. 8, a computerized modeling system 800 is shown and includes a CPU 802, a computer monitor 804, a keyboard input device 806, a mouse input device 808, and a storage device 810. The CPU 802, computer monitor 804, keyboard 806, mouse 808, and storage device 810 can include commonly available computer hardware devices. For example, the CPU 802 can include a Pentium-based processor. The mouse 808 may have conventional left and right buttons that the user may press to issue a command to a software program being executed by the CPU 802. As an alternative or in addition to the mouse 808, the computerized modeling system 800 can include a pointing device such as a trackball, touch-sensitive pad, or pointing device and buttons built into the keyboard 806. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft® Windows® 2000, Windows XP, Windows Vista®, Windows 7, UNIX®, Linux, or Mac OS® operating systems.

Additional computer processing units and hardware devices (e.g., graphic processing units (GPUs), rapid prototyping, video, and printer devices) may be included in the computerized modeling system 800. Furthermore, the computerized modeling system 800 may include network hardware and software thereby enabling wired or wireless communication to a hardware platform 812, and facilitating communication between numerous computer systems that may include a CPU and a storage system, among other computer components.

Computer-aided modeling software may be stored on the storage device 810 and loaded into and executed by the CPU 802. The modeling software allows a user to create and modify a 3D model, and implements aspects of the invention described herein. The CPU 802 uses the computer monitor 804 to display a 3D model and other aspects thereof as described. Using the keyboard 806 and the mouse 808, the user can enter and modify data associated with the 3D model. The CPU 802 accepts and processes input from the keyboard 806 and mouse 808. The CPU 802 processes the input along with the data associated with the 3D model and makes corresponding and appropriate changes to that which is displayed on the computer monitor 804 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. In one embodiment, the present invention is implemented using the OpenGL and the GLSL shading language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

High quality rendering in the manner described herein not only realizes time-saving advantages. For example, a 3D model may be rendered directly from the model's definition (e.g., analytical surface definition) rather than having to create a tessellation of the model as a pre-requisite to rendering. Other advantages include the alleviation of gap/crack artifacts, as well as the need to store large tessellations of models and to transmit the tessellations from one processing unit (e.g., a CPU) to another processing unit (e.g., GPU). Generally, the present invention is not limited by bandwidth due to the compact surface representations discussed herein, and therefore, is well-suited for client graphics applications as well as other applications. Furthermore, as GPU technology advances the fillrate-limited techniques described herein will have less of an impact on performance. CAD modeling using solid modeling techniques is widely used in the fields of engineering, industrial design, and entertainment, all of which could benefit from implementations of the present invention.

This invention has been particularly shown and described with references to example embodiments thereof. Nevertheless, it will be understood by those skilled in the art that various modifications in form and details may be made without departing from the scope of the invention encompassed by the appended claims. For example, implementations may change the order in which operations are performed. Furthermore, depending on the needs of an implementation, particular operations described herein may be implemented as a combined operation, eliminated, added to, or otherwise rearranged. By way of non-limiting example, one embodiment may implement the cell data structure as a different structure over the parametric domain, (e.g., as a k-dimensional tree).

What is claimed is:

1. A computer-implemented method for rendering a computer-aided design model representing a real-world object, the method comprising:
   constructing a boundary representation data structure of the computer-aided design model, the boundary representation data structure storing topological data comprised of data defining a face;
   constructing a data structure representing a parameter space of the face;
   decomposing the parameter space into a plurality of cells;
   for each cell, indicating a presence of the face in the cell by designating the cell as one of an empty type cell, a full type cell, an edge type cell, and a vertex type cell;
   encoding the plurality of cells into a texture construct;
   transmitting the texture construct to a graphics processing unit where further processing renders the face on a computer monitor,
   wherein the edge type cell and the vertex type cell reference representations of one or more trimming surfaces, wherein the trimming surfaces correspond to neighboring faces of the face; and
   performing a ray casting process to render the face using data encoded in the texture construct as determined by an intersection of a ray and a surface corresponding to the face.

2. The computer-implemented method as claimed in claim 1 further comprising: storing an underlying surface of the face, a uv parameter space bounding box of the face, and a 3D bounding box of the face; and encoding the one or more trimming surfaces in a trimming surface texture for transmission to and processing by a the graphics processing unit.

3. The computer-implemented method as claimed in claim 1 wherein each of the trimming surfaces are represented analytically as one of a plane, a cylinder, a cone, a sphere, a toms, a NURBS surface, and a generic surface.

4. The computer-implemented method as claimed in claim 1 further comprising upon receiving the texture construct, the graphics processing unit performs ray casting to render the face, said graphics processing unit using the texture construct and one or more trimming surface representations, said one or more trimming surface representations referenced by the plurality of cells encoded in the texture construct.

5. The computer-implemented method as claimed in claim 4 further comprising:
   implementing a point classification process by determining whether a ray intersects an underlying surface of the face; and
   rendering a corresponding pixel if the ray intersects with the underlying surface.

6. The method as claimed in claim 1 wherein a central processing unit encodes the presence of the face as a cell type, where:
   (i) the empty type cell indicates that no part of the face intersects with the parameter space area corresponding to the empty type cell;
   (ii) the full type cell indicates that a total area of the full type cell contains material of the face;
   (iii) an edge type cell stores a reference to a trimming surface corresponding to a neighboring face of the face; and
   (iv) a vertex cell stores references to two trimming surfaces corresponding to two neighboring faces of the face.

7. The method as claimed in claim 1 wherein the plurality of cells is stored in a cell data structure and implemented as one of a grid structure and a tree data structure.

8. A computer-aided design system, comprising:
   a central processing unit (CPU) operatively coupled to a data storage system, the data storage system storing a three-dimensional model; and
   a data storage memory operatively coupled to the CPU and comprising instructions to configure the CPU to transmit data to a graphics processing unit (GPU) causing the GPU to render the three-dimensional model, free of any tessellation, by:
   receiving a trim state texture from the CPU, wherein: the trim state texture is constructed by encoding a cell data structure comprised of a plurality of cells, a decomposition of a parameter space of a topological face created the plurality of cells, and each cell is designated as an empty type cell, a full type cell, an edge type cell, and a vertex type cell;
   receiving a trim surface texture from the CPU, wherein: a trimming surface represents a neighboring face of the topological face, and the CPU encodes the trimming surface in the trim surface texture for transmission to the GPU; and performing a ray casting process to render the topological face using data encoded in the trim state texture and the trim surface texture as determined by an intersection of a ray and a surface corresponding to the topological face.

9. The computer-aided design system as claimed in claim 8 wherein:

the empty type cell indicates that no part of the topological face intersects with a parameter space area corresponding to the empty type cell;

the full type cell indicates that a total area of the full type cell contains material of the topological face; and the edge type cell and the vertex type cell reference representations of one or more trimming surfaces corresponding to neighboring faces of the topological face.

10. The computer-aided design system as claimed in claim 8 wherein the ray casting process utilizes a fragment shader to compute the intersection of the ray and the surface corresponding to the topological face.

11. The computer-aided design system as claimed in claim 8 wherein the trim state texture references the trim surface texture that encodes the trimming surface.

12. A computer-aided design system as claimed in claim 10 wherein the trimming surfaces are represented analytically as one of a plane, a cylinder, a cone, a spline, a torus, and a generic surface.

13. The computer-aided design system as claimed in claim 8 wherein the cell data structure is implemented as one of a grid structure and a tree data structure.

14. A non-transitory computer-readable data storage medium comprising instructions for causing a computer to configure a central processing unit (CPU) to transmit data to a graphics processing unit (GPU) causing the GPU to render the three-dimensional model, free of any tessellation, by:

receiving a trim state texture from the CPU, wherein: the trim state texture is constructed by encoding a cell data structure comprised of a plurality of cells, the decomposition of a parameter space of a topological face created the plurality of cells, and each cell is designated as an empty type cell, a full type cell, an edge type cell, and a vertex type cell;

receiving a trim surface texture from the CPU, wherein: a trimming surface represents a neighboring face of the topological face, and the CPU encodes the trimming surface in the trim surface texture for transmission to the GPU; and performing a ray casting process to render the topological face using data encoded in the trim state texture and the trim surface texture as determined by an intersection of a ray and a surface corresponding to the topological face.

15. The computer-readable data storage medium as claimed in claim 14 wherein the edge type cell and the vertex type cell reference representations of at least one trimming surface corresponding to one or more neighboring faces of the topological face.

16. The computer-readable data storage medium as claimed in claim 14 wherein the ray casting process utilizes a fragment shader that computes the intersection of the ray and a surface corresponding to the topological face.

17. The computer-readable data storage medium as claimed in claim 14 wherein the trim state texture references the trim surface texture that encodes the trimming surface.

18. A computer-readable data storage medium as claimed in claim 14 wherein the trimming surfaces are represented analytically as one of a plane, a cylinder, a cone, a spline, a torus, and a generic surface.

19. The computer-readable data storage medium as claimed in claim 14 where the CPU encodes the presence of the face as a cell type where:

(i) the empty type cell indicates that no part of the topological face intersects with a uv parameter space area corresponding to the empty type cell;

(ii) the full type cell indicates that a total area of the full type cell contains material of the topological face;

(iii) an edge type cell stores a reference to a trimming surface corresponding to the neighboring face of the topological face; and (iv) a vertex cell stores references to at least two trimming surfaces corresponding to at least two neighboring faces of the topological face.

* * * * *

UNITED STATES PATENT AND TRADEMARK OFFICE
CERTIFICATE OF CORRECTION

Page 1 of 1

PATENT NO. : 8,982,121 B2
APPLICATION NO. : 13/349421
DATED : March 17, 2015
INVENTOR(S) : Iddo Hanniel and Kirk Haller It is certified that error appears in the above-identified patent and that said Letters Patent is hereby corrected as shown below:

In the Claims

In Column 14, Claim 1, line 1 insert --:-- after "wherein"

In Column 14, Claim 1, line 2 insert --and-- after "surfaces,"

In Column 14, Claim 1, line 3 delete "wherein"

In Column 14, Claim 1, line 3 insert --one or more-- after "the" and before "trimming"

In Column 14, Claim 1, line 3 insert --one or more-- after "to"

In Column 14, Claim 2, line 14 delete "by a" and insert --by--

In Column 14, Claim 3, line 18 delete "toms" and insert --torus--

In Column 14, Claim 8, line 62 after "designated as" insert --one of--

In Column 15, Claim 9, line 17 insert --one or more-- after "to" and before "neighboring"

In Column 15, Claim 14, line 41 after "designated as" insert --one of--

Signed and Sealed this
Fourteenth Day of July, 2015

Michelle K. Lee
*Director of the United States Patent and Trademark Office*